Oct. 25, 1966 D. T. GWILLIM 3,281,038

MAGNETIC TAPE RECORDING AND REPRODUCING APPARATUS

Filed Dec. 21, 1964

United States Patent Office 3,281,038
Patented Oct. 25, 1966

3,281,038
MAGNETIC TAPE RECORDING AND REPRODUCING APPARATUS

David Thomas Gwillim, London, England, assignor to Decca Limited, London, England, a British company Filed Dec. 21, 1964, Ser. No. 419,710
Claims priority, application Great Britain, Dec. 23, 1963, 50,760/63
8 Claims. (Cl. 226—95)

Figures 1, 2:
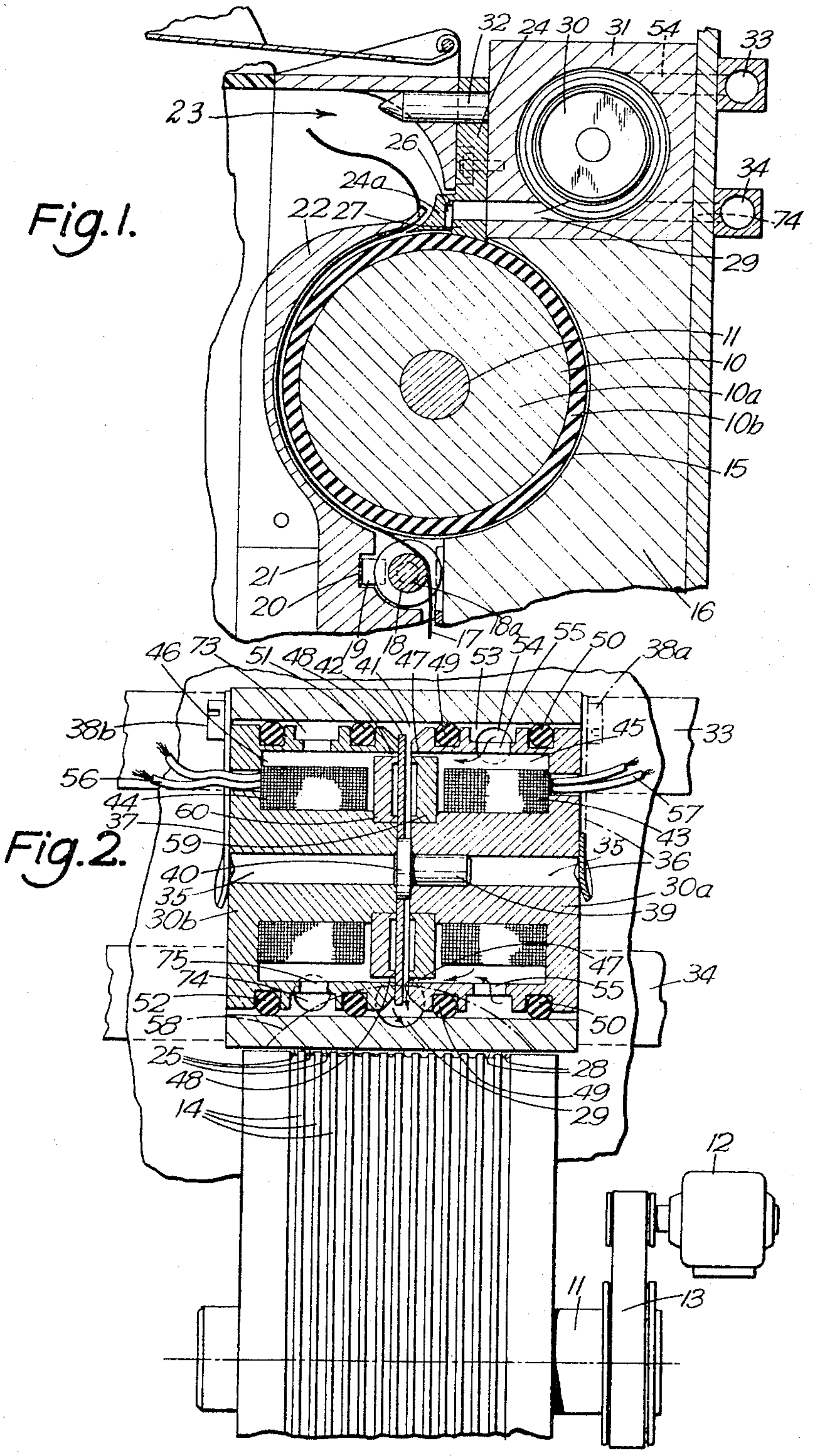

This invention relates to magnetic tape recording and reproducing apparatus and particularly high speed tape handling apparatus such as may be used for example, in association with digital data processing apparatus.

In such tape handling apparatus, the magnetic tape has to be traversed past a recording and reproducing head system at high speed and has to be started and stopped very quickly. It is therefore the practice to have one or more tape drive captans, for drawing a length of tape past the recording and reproducing head system or for drawing it out of or feeding it into a reservoir. In high speed systems, for starting and stopping of the tape, the capstan is driven continuously and is provided with releasable means for engaging the tape. For this purpose pinch rollers may be employed but for greater reliability in very high speed tape handling apparatus, vacuum capstans are employed, such as for example the capstan disclosed and claimed in the specification of United States Patent No. 3,151,795.

Heretofore it has been the practice to make the capstan member as smooth as possible to reduce friction when the tape is not being driven, the capstan surface normally being of polished metal. For the same reason, an angular arc over which the tape extends around a capstan has also been kept to the minimum. The tape engaging means must hold the tape firmly against the capstan so that it is driven thereby and, with a vacuum capstan, these requirements lead to the use of a high vacuum over a limited angular extent. The use of a high vacuum necessitates a high degree of sealing with consequent expense of manufacture and limitations to the possible arrangements. It moreover increases the problem in obtaining high speed operation.

According to the present invention, a magnetic tape handling apparatus having one or more tape drive capstans for drawing a length of tape past a recording and reproducing head system and/or for drawing tape out of or feeding it into a reservoir, is characterised in that the or each capstan has a surface of friction material and the tape is arranged to extend around the capstan over an arc of such an extent that the tension of the tape, when being driven, increases around this arc by a factor of at least 3 and preferably by a factor of at least 5.

Heretofore, it has been the general practice to use highly polished metal capstans which do not give any appreciable mechanism amplification of the tension. With the arrangement of the present invention, the coefficient of friction and the wrap angle around the capstan are made such as to give a substantial amplification. The wrap angle is conventiently made greater than 90° and may typically be of the order of 180°. The coefficient of friction will normally be made at least 0.5 and preferably is greater than 0.75; typically a rubber surface might be employed having a coefficient of friction of substantially unity. It is thus readily possible to get an amplification of the tension by a factor much greater than 5. It is thus possible to operate with only a small driving torque on the tape at the leading end of the arc over which the tape extends. Preferably a vacuum capstan is employed; because of the small driving torque necessary on the tape at the leading end of the arc over which the tape extends, it is possible, with the arrangement of the present invention, to use a much lower vacuum than has heretofore been the practice in vacuum capstans for magnetic tape units. When the tape is not being driven, the high coefficient of friction and the large wrap angle are immaterial provided there is no tension on the tape and this is readily achieved in a unidirectional tape drive system. However, it is preferable to lift the tape from the capstan when the tape is not being driven: for this purpose, air pressure may be applied in place of the vacuum. For a unidirectional drive system, such as may typically be employed with a loop of tape, only a single capstan is necessary; with a loop of tape, conveniently the tape is stored in a scramble bin type of reservoir. The arrangement of the present invention may also be used with bi-directional drive systems; the tension in the tape tracking from the driving capstan may be made sufficiently great that it would overcome the sliding friction tending to resist movement of the tape around the non-driving capstan but, it would be preferable to provide means for lifting the tape off the non-driving capstan, e.g. by air pressure.

In the construction of the present invention, it becomes readily possible to use relatively simple systems for holding the tape onto the capstan. Conveniently a simple vacuum system is used with the vacuum applied to a chamber over the peripheral surface of the capstan just beyond the point where the tape leaves the capstan when the capstan is driving the tape and a series of grooves being provided extending arcuately along the peripheral surface of the capstan so that the vacuum suction from the chamber is applied to the undersurface of the leading portion of the tape on the capstan. Since only a low vacuum is necessary, it is readily possible to provide a vacuum pump capable of dealing with any leakage which may occur with vacuum suction systems of this kind. This arrangement, however, enables the suction to be applied and controlled at a position close to the point of application of suction to the tape yet avoids any necessity of having a valve inside the capstan as in the constructions described in the aforementioned United States Patent No. 3,151,795. For lifting a tape slightly off a non-driving capstan, a change-over valve may be provided for applying alternatively vacuum or pressure to said grooves so that, when the tape is not being driven by the capstan, it may be blown away from the surface of the capstan.

In a vacuum capstan system as described above, conveniently the grooves each extend continuously around the capstan member. This ensures that the vacuum is applied over the whole length of the arc around which the tape extends. It moreover makes it possible to seal the vacuum system more efficiently by having, in the arcuate region over which the tape does not pass, a fixed member close to the capstan surface with protuberances which extend completely into the grooves. At the leading end of the arc over which the tape extends, that is to say, where the tape leaves the capstan, the vacuum chamber may be shaped to form or may carry a tape stripper with fingers extending partially into said grooves, with adequate clearance for the vacuum suction to be effected along the grooves; with this construction, it is readily possible to ensure that the stripper is sufficiently close to the capstan surface to prevent any possibility of the tape tending to pass under the stripper.

When a vacuum capstan is drawing tape over a recording or reproducing head, it is necessary to apply back tension to the tape on the side of the head remote from the capstan. Conveniently this may be done by means of a vacuum tensioning block over which the tape rides and which has a series of transverse grooves or holes connected to a vacuum source. In the tape handling apparatus of the present invention and employing a vacuum capstan as described above, preferably the vacuum tensioning block is supplied from the same vacuum source as the capstan. If the capstan and the back tensioning block were supplied from different independent vacuum sources a sudden decrease in the vacuum in, for instance, the capstan supply might not be matched sufficiently rapidly by a reduction in the tension applied to the tape by the back tensioning block supplied from a different source to maintain constant acceleration or deceleration for starting or stopping the tape. However, if the capstan and back tensioning means are supplied from the same source this danger is reduced.

In the following description reference will be made to the accompanying drawings in which:

FIGURE 1 is a sectional view from one side of a part of a magnetic tape handling apparatus; and FIGURE 2 is a section view from the front, partly cut away, of part of the apparatus shown in FIGURE 1.

Referring to FIGURES 1 and 2 a capstan member 10, cylindrical in form, is mounted on a shaft 11 which is continuously rotated, to have a peripheral speed which would typically be of the order of 150 inches per second by a constant speed motor 12 via the pulley belt 13 as shown in FIGURE 2. The capstan 10 is formed of an inner cylindrical member 10*a* and an outer cylindrical member 10*b* of rubber or other material having a high coefficient of friction: preferably a coefficient of friction which is substantially unity. The member 10*b* has a plurality of circumferential grooves 14 extending completely around the periphery 15 of the capstan. The shaft 11 is supported in a housing 16 which for simplicity is shown as a sectioned block in FIGURE 1. As is seen in FIGURE 1 magnetic tape 17 is arranged to pass over a substantial sector, which is typically about 150°, of the periphery 15 of the capstan and to lie over the grooves 14, the tape being fed over the roller guide 18 having flanges 18*a* and held by the action of the spring 19 so that the flanges 18*a* are located in suitable grooves which are in the fixed housing 16 and prevent the guide 18 from rotating. The spring 19 is located in the recess 20 of a block 21 which may form part of a removable cassette, conveniently of the kind described and claimed in the complete specification of my copending patent application Serial No. 419,711. After passing over the roller guide 18 the tape passes closely over the capstan, which protrudes into the bay 22 formed in the cassette, and is forced to leave the capstan to pass into the chamber 23 of the cassette by the stripper 24 which, as can be seen in more detail in FIGURE 2, has a portion 24*a* with an arcuate face over which the tape is to pass, the lower end of which has a plurality of fingers 25 which extend partially into the grooves 14 of the capstan. When the capstan is driving the tape, the tape is held on by vacuum applied to the circumferential grooves 14 via the vacuum chamber 26 formed by the portion of the stripper 24*a* and a further portion 27 having members 28 extending all the way into the circumferential grooves 14 so as to efficiently seal off one side of the vacuum chamber. The vacuum chamber 26 is supplied with vacuum to hold the tape onto the capstan or, as the case may be, air pressure so as to blow the tape off the capstan when the capstan is not in use, via the passage 29 supplied with vacuum or air pressure from the vacuum valve 30 housed in a housing 31 mounted on the main apparatus casing. A spigot 32 is located in the upper portion of the stripper to serve as a locating spigot for the cassette. The vacuum valve is supplied with vacuum and air pressure from manifolds 33 and 34 respectively.

Referring now more particularly to FIGURE 2, which is a front elevation partly in section of the capstan and vacuum valve, the vacuum valve comprises a body in two portions 30*a* and 30*b*, each having a central passage 35 extending in a direction parallel to the axis of the capstan. The two portions 30*a* and 30*b* are held against lateral movement by spring retainers 36, 37 attached to the housing 31 by the bolts 38*a* and 38*b*. In the passage 35 there is located a button 39 having a collar 40, the periphery of which protrudes into a central passage 41 in the housing. On the collar 40 is mounted a thin armature plate 42 which can be moved across the width of the passage 41 by appropriately energising toroidal armature coils 43, 44 located in annular chambers 45, 46 respectively in either portion of the valve body. The chambers 45, 46 are connected to the central passage 41 by annular ducts 47, 48 respectively.

The valve body members 30*a* and 30*b* are supported in the housing 31 and two pairs of O-rings 49 and 50 seal off the central annular passage 41 and an annular inlet chamber 53 passing completely round the periphery of valve body member 30*a* and closed by the housing 31, being connected to the manifold 33 via the duct 54 in the housing 31 and to the chamber 45 via the annular aperture 55 in the valve body member 30*a*. In like manner, the O-rings 51, 52 seal off the annular inlet chamber 73 passing completely round the periphery of of valve body member 30*b*, being closed by the housing 31 and connected to the lower manifold 34 via the duct 74 in the housing 31 and to the chamber 46 via the annular duct 75 in the valve body member 30*b*.

Vacuum may be admitted to the vacuum chamber 28, so that the tape is engaged and driven by the capstan, by appropriately energising the armature coils 43, 44 via the leads 56, 57 respectively so as to force the armature plate into the left hand position as shown, the armature plate resting against the left hand plate 60 of the two armature backing plates 59, 60 abutting the central passage 41 and disposed on opposite halves 30*a*, 30*b* of the valve body. The vacuum supply is thereby connected to the grooves 14 via the manifold 33, the duct 54, the inlet chamber 53, the aperture 55, the duct 47, the central pasage 41 and the duct 29 which opens into the passage 41 at its lower end and which leads to the vacuum chamber 26 whose roof is shown by the chain line 58. Air pressure is supplied to the chamber 26, so as to force the tape away from the capstan and stop the tape, in an exactly similar manner from the manifold 34 through the duct 74, the inlet chamber 73, the aperture 75, the chamber 46, duct 48 and the central passage 41 and duct 29 when the armature plate 42 is in the right hand position against the backing plate 59. For a fast response to the switching from vacuum supply to air pressure supply the inner portion of the passage 41 would have a thickness just greater than that of the armature plate 42. It will be seen that vacuum and air pressure do in fact exist all the time in the chambers 45, 46 respectively, and the existence of one or other in the chamber 26 is determined solely by the position of the armature plate. This means that the manifolds 33 and 34 may be connected to constant vacuum or pressure sources.

I claim:

1. In magnetic tape handling apparatus for drawing a length of tape past a recording and reproducing head or for drawing tape out of or feeding it into a tape reservoir, the combination of a tape drive capstan having a cylindrical drive member the surface of which has a coefficient of friction substantially unity and with the tape extending around the drive member over a wrap angle of at least a right angle and at least one groove extending around the periphery of the drive member, means for applying vacuum to said groove to force the tape into engagement with said drive member, and means for rotating the drive member.

2. In magnetic tape handling apparatus for drawing a length of tape past a recording and reproducing head or for drawing tape out of or feeding it into a tape reservoir, the combination of a tape drive capstan having a cylindrical drive member the surface of which has a coefficient of friction substantially unity and with the tape extending around the drive member over a wrap angle of at least a right angle, a series of circumferential grooves extending around the peripheral surface of the drive member, a chamber located over the peripheral surface of the capstan just beyond the point where the tape leaves the drive member when the capstan is driving the tape, means for applying vacuum to said chamber so that vacuum suction from the chamber is applied to the undersurface of at least the leading portion of the tape on the drive member, and means for rotating said drive member.

3. The combination as claimed in claim 2 wherein one portion of the vacuum chamber is formed by a fixed member, having protuberances which extend into the grooves, located close to the capstan in the arcuate region over which the tape does not pass.

4. The combination as claimed in claim 2 wherein, where the tape leaves the capstan, the vacuum chamber is shaped to form a tape stripper with fingers extending partially into said grooves, with adequate clearance for the vacuum suction to be effected along the grooves.

5. In magnetic tape handling apparatus for drawing a length of tape past a recording and reproducing head or for drawing tape out of or feeding it into a tape reservoir, the combination of a tape drive capstan having a cylindrical drive member the surface of which has a coefficient of friction substantially unity and with the tape extending around the drive member over a wrap angle of at least a right angle, a series of circumferential grooves extending around the peripheral surface of the drive member, a chamber located over the peripheral surface of the capstan just beyond the point where the tape leaves the drive member when the capstan is driving the tape, means for alternately applying vacuum or air pressure to said chamber so as to force the tape into and out of engagement respectively with said drive member, and means for rotating the drive member continuously.

6. The combination as claimed in claim 5 wherein said means for applying vacuum or air pressure to said chamber comprises separate sources for supplying vacuum or air pressure, and a valve connected with said sources and operative to alternately supply the vacuum or air pressure to said chamber.

7. In magnetic tape handling apparatus for drawing a length of tape past a recording and reproducing head or for drawing tape out of or feeding it into a tape reservoir, the combination of a tape drive capstan having a cylindrical drive member the surface of which has a coefficient of friction substantially unity and with the tape extending around the drive member over a wrap angle of at least a right angle a series of circumferential grooves extending around the peripheral surface of the drive member, a vacuum chamber located over the peripheral surface of the capstan just beyond the point where the tape leaves the drive member when the tape is being driven by the capstan, the vacuum chamber being formed by a first fixed portion, located close to the capstan in the arcuate region over which the tape does not pass, having protuberances which extend completely into said grooves, and a second portion shaped to form a tape stripper with fingers extending partially into said grooves with adequate clearance for vacuum suction to be effected along the grooves, means for applying vacuum to said chamber and means for rotating the drive member.

8. In magnetic tape handling apparatus for drawing a length of tape past a recording and reproducing head or for drawing tape out of or feeding it into a tape reservoir, the combination of a tape drive capstan having a cylindrical drive member the surface of which has a coefficient of friction substantially unity and with the tape extending around the drive member over a wrap angle of at least a right angle a series of circumferential grooves extending around the peripheral surface of the drive member, a vacuum chamber located over the peripheral surface of the capstan just beyond the point where the tape leaves the drive member when the tape is being driven by the capstan, the vacuum chamber being formed by a first fixed portion, located close to the capstan in the arcuate region over which the tape does not pass, having protuberances which extend completely into said grooves, and a second portion shaped to form a tape stripper with fingers extending partially into said grooves with adequate clearance for vacuum suction to be effected along the grooves, separate sources of vacuum and air pressure, a valve connected to said sources and operative to apply vacuum or air pressure alternatively to said chamber so as to force the tape into and out of engagement respectively with said drive member, a motor having a continuously rotating output shaft, and transmission means for driving said drive member from said output shaft.

References Cited by the Examiner

UNITED STATES PATENTS

| | | | |
|---|---|---|---|
| 2,804,974 | 9/1957 | Noon | 271—27 X |
| 3,071,332 | 1/1963 | Dain | 226—95 X |
| 3,143,267 | 8/1964 | Maxey | 226—95 |
| 3,151,795 | 10/1964 | Gwillim | 226—95 |
| 3,189,240 | 6/1965 | Emslie | 226—97 X |

FOREIGN PATENTS

| | | |
|---|---|---|
| 677,882 | 7/1939 | Germany. |

M. HENSON WOOD, Jr., *Primary Examiner.*

J. N. ERLICH, *Assistant Examiner.*